July 6, 1965 N. CELESTINI 3,193,622

RESTRICTED SERVICE ARRANGEMENTS

Filed Nov. 22, 1961 3 Sheets-Sheet 1

INVENTOR.
NADIOS CELESTINI

BY C. A. Gulbrandsen

ATTY.

RESTRICTED SERVICE ARRANGEMENTS

Filed Nov. 22, 1961

INVENTOR.
NADIOS CELESTINI

BY C. A. Gulbrandsen
ATTY.

July 6, 1965 N. CELESTINI 3,193,622

RESTRICTED SERVICE ARRANGEMENTS

Filed Nov. 22, 1961 3 Sheets-Sheet 3

INVENTOR.
NADIOS CELESTINI

BY C. A. Gulbrandsen
ATTY.

United States Patent Office 3,193,622

Patented July 6, 1965

3,193,622

RESTRICTED SERVICE ARRANGEMENTS

Nadios Celestini, Milan, Italy, assignor to Automatic Electric Laboratories, Inc., Northlake, Ill., a corporation of Delaware Filed Nov. 22, 1961, Ser. No. 154,191
8 Claims. (Cl. 179—27)

The present invention relates to telephone systems in general and more particularly to restricted service arrangements in private automatic branch exchange systems associated with central exchanges by way of trunk lines extending there-between. In this respect, central exchanges as used herein may also include private exchanges, for example, other private automatic branch exchanges with tie-lines being used as the inter-connecting medium.

A private automatic branch exchange, or PABX, conventionally comprises a local operator's desk, or attendant station, a number of subscriber telephones, a plurality of subscriber lines extending individually from the subscriber telephones to associated subscriber line circuits, and further comprises at least one trunk line extending between a central exchange and the PABX, wherein it terminates at a trunk circuit.

Occasionally, separate groups of local connecting equipment are employed in a PABX, one group being allotted for use by fully restricted subscribers entitled to set-up calls only within the PABX, while another group of connecting equipment permits key personnel to set-up calls locally and to the central exchange. This, however, is an inefficient arrangement and not flexible to meet restriction requirements.

It is preferable, therefore, to use the same group or groups of connecting equipment in common with subscriber lines of varying degrees of restriction. If this is done means must be provided for automatically indicating the classification of the calling subscriber to the connecting equipment.

In some PABX arrangements provisions are made for enabling a PABX subscriber engaged in a trunk call to set up an inquiry or "call-back" connection to a third party, such as another PABX subscriber or central office subscriber, for obtaining needed information from this third party while the trunk used in the original trunk call is held. In most PABX systems affording this facility, the call-back connection extends over a "call-back line," that is, a line which is accessible to and seized by the original trunk circuit in response to a signal transmitted by the first-mentioned PABX subscriber during the original trunk call and which, by way of its associated line circuit, in turn has access to the PABX switching equipment. It is conceivable that the restriction of a subscriber might be circumvented if a calling subscriber who has been connected to a first central office trunk circuit, say with the aid of the attendant, initiates a call-back connection and then controls his local switching equipment over the call-back line to set up an unauthorized type of connection, say, one involving a second trunk circuit. For example, in private automatic branch exchanges which provide a marking in the subscriber's line circuit to prevent unauthorized access to central exchange trunk, or the setting up of certain types of connections over these trunks, according to the privilege or restriction of the PABX subscriber; this marking would be ineffective if the trunk circuit were seized by the call-back line without marking facilities.

It is one of the objects of the present invention to avoid such circumvention of the subscriber's restriction.

According to the main feature of the invention, this is accomplished by an arrangement whereby the means used in establishing a call-back connection automatically passes to the switching equipment used in the call-back connection, the electrical potential condition corresponding to the privilege of the calling subscriber, thereby preventing the setting-up of unauthorized special service connections by way of the call-back line. These special service connections may include for example automatic access to a trunk circuit without the aid of an attendant, toll service, and/or executive right-of-way privileges.

More particularly it is one of the features of the invention to provide a switching device in the trunk circuit which passes an electrical potential characteristic of the subscriber's privilege, or restriction, as applied to a marking conductor extending from the subscriber's line circuit, over a conductor of the call-back line, thereby conditioning the switching equipment seized in the call-back connection according to the subscriber's classification.

Other features of the invention relate to the provision of improved strapping arrangements wherein the setting-up through the local switching equipment of various kinds of connections is dependent upon electrical potentials applied in the subscriber's line circuit over marking conductors extending therefrom. These, or corresponding, potentials may then be automatically applied to the call-back line seized in a trunk call.

Further features of the invention relate to the particular arrangement of the circuit elements thereof, whereby the above-outlined and additional operating features are attained.

The invention, both as to its organization and method of operation, together with further objects and advantages thereof, will best be understood by reference to the following detailed description of a preferred embodiment, taken in conjunction with the accompanying drawings. These drawings, FIGS. 1 through 4 inclusive, show, by means of the usual circuit diagrams, a sufficient amount of apparatus to enable the invention to be described and understood.

FIG. 1 shows in the upper left-hand corner, portions of a subscriber telephone, which is connected over a subscriber's line to an associated subscriber line circuit of the common line relay and individual line cut-off relay type. A circuit arrangement of this kind has been disclosed in detail in my copending patent application, S.N. 71,703, filed November 25, 1960, on a Line Finding Arrangement. In the line circuit FIG. 1 is shown among others, a strapping arrangement marking conductors extending to apparatus in other figures, and other conductors extending to the local operator's desk, shown below the subscriber's telephone, and also to common equipment indicated in block in FIG. 1. Moreover, FIG. 1 shows, below the subscriber's line circuit, a call-back line circuit which in certain respects is similar to the subscriber's line circuit, except that it does not include the strapping arrangement.

FIG. 2 shows portions of local connecting equipment comprising a non-numerical switch, such as a rotary switch finder 2CR, having wipers which sweep across individual bank contacts, shown grouped in simple form on the drawing as an arc, for access to all subscriber line circuits and all call-back line circuits connected actively thereto. It further comprises a rotary switch connector 2CN likewise represented and having access through its bank levels to subscriber line circuits, trunk circuits, an attendant's equipment not shown, and other common equipment. Yet individual bank contacts are shown for the tracing of certain paths through the local connecting equipment. In addition to the above equipment, it also includes marking conductors involved in the establishment of restricted and non-restricted telephone connections.

GENERAL DESCRIPTION

Figure 1:
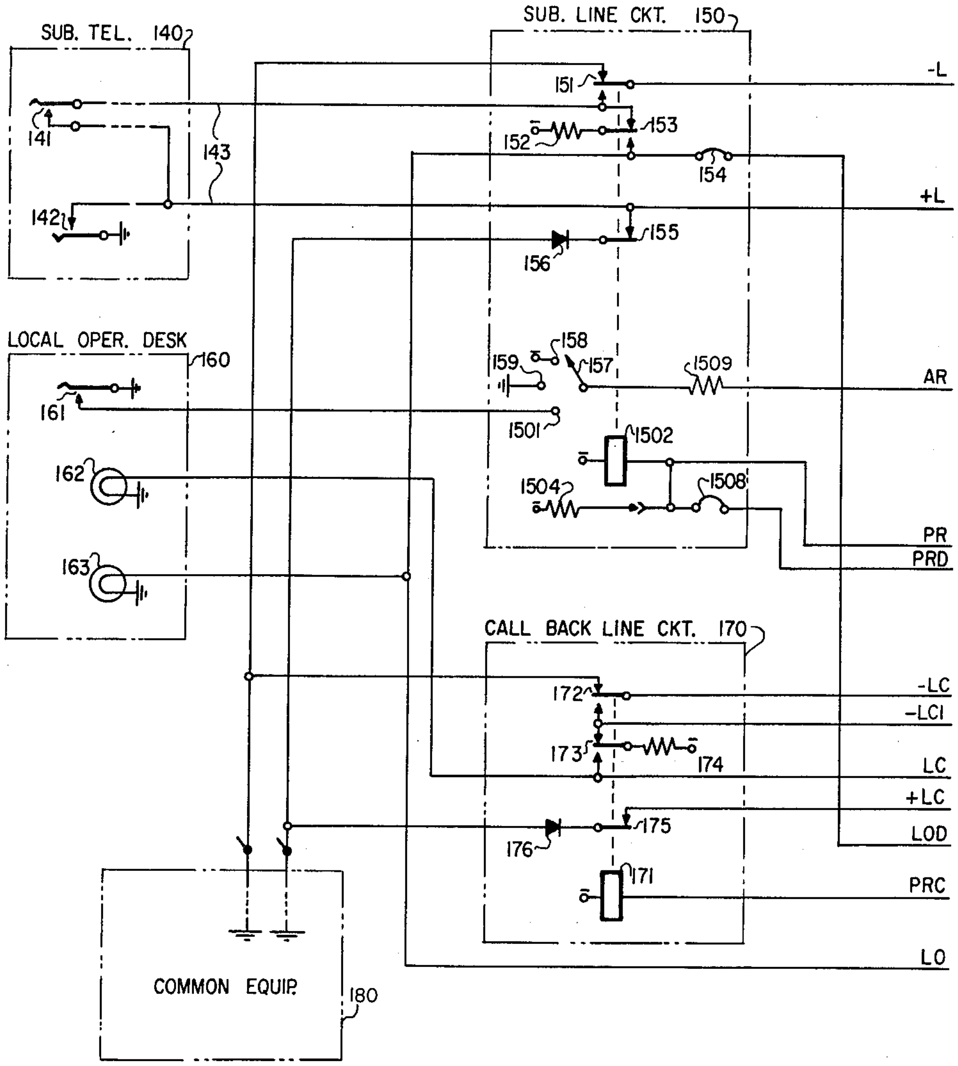
Figure 4:
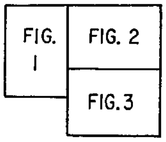
FIG. 4 shows how the drawings, FIGS. 1 to 3, should be placed relative to each other in order to simplify the tracing of the circuits.

It will be understood that while the subscriber's line circuit has been shown in FIG. 1 as being of the common line relay and individual cut-off relay type disclosed in the above-identified copending application, other types of line circuits are also applicable for use in restricted service arrangements embodied in this invention. Likewise, other types of switches, for example, types of non-numerical switches other than the rotary switch finders shown in each of these figures may be used.

In the embodiment shown, a local PABX subscriber, FIG. 1, privileged to establish connections with called subscribers in the central exchange area removes the handset of his telephone and thereby causes the associated subscriber line circuit to become activated. This entails seizure of the common line relay equipment which in turn allots an idle local connecting equipment unit, FIG. 2, and causes its rotary switch finder to find the subscriber's line circuit appearing on its banks.

Figure 3:
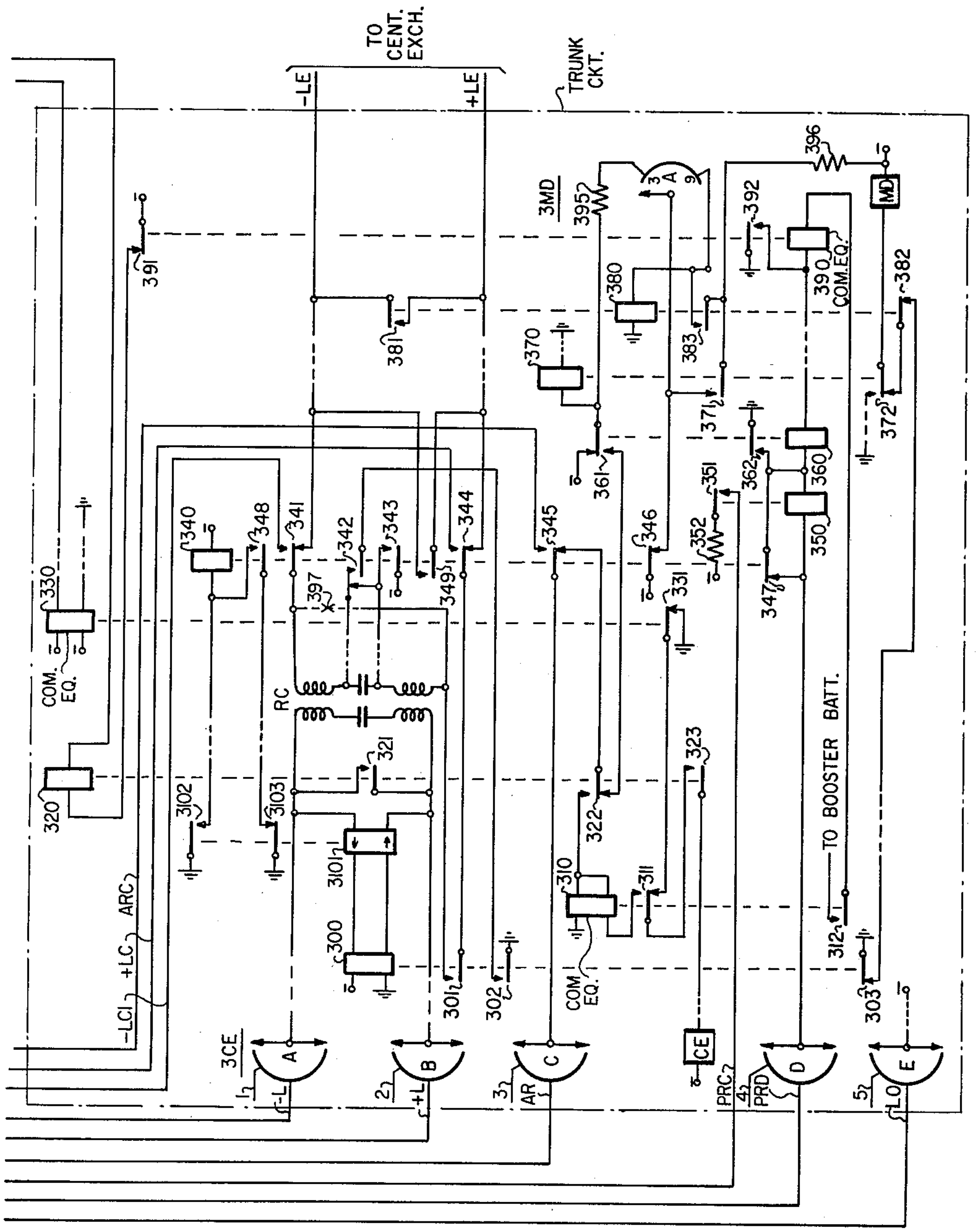
FIG. 3 represents portions of a trunk circuit, also having a similarly drawn non-numerical rotary switch finder with access to both subscriber line circuits and call-back line circuits. Appropriate marking conductors connect therefrom to other equipment for the establishment of restricted and non-restricted telephone connections.

The subscriber may now proceed to set-up a connection to a trunk circuit, FIG. 3. In the embodiment described herein the calling subscriber gains access to the trunk circuit by dialing a predetermined digit into the local switching equipment. It should be mentioned, however, that the present invention is also applicable to systems in which trunk access is gained in some other way, such as by operating a differential relay by means of a push button at the subscriber station.

Upon seizure of the trunk circuit, the rotary switch finder in the trunk circuit finds the activated subscriber line circuit, in accordance with a marking applied by the local finder, and thereby establishes a direct connection between the subscriber's telephone and the trunk circuit. Thereafter, the local connecting equipment used in the establishment of the connection releases and becomes available for further use.

Privilege marking means in the subscriber line circuit are extended over a marking conductor to the trunk circuit, thereby conditioning it to permit further dialing into the central exchange for the setting-up of connections with called subscribers therein, including toll connections.

During the ensuing conversation, the calling subscriber may require supplemental information from another PABX subscriber. The former then depresses a button on the telephone, thereby splitting the trunk circuit connection so that it extends his portion, by way of a call-back line, to an idle unit of local connecting equipment. In a manner similar to the initiation of a call at a substation, the common equipment conditions the latter connecting equipment so that it finds the call-back line circuit. Switching means in the trunk circuit also passes on to the call-back line the various privileges granted the calling subscriber in accordance with the marking means in his line circuit. Thereafter, the further setting-up of the call-back connection will be governed by these last-mentioned privileges.

A detailed description of the operation of the embodiment follows.

A. *Call from subscriber privileged for trunk connections setting up of trunk connection*

Figure 2:
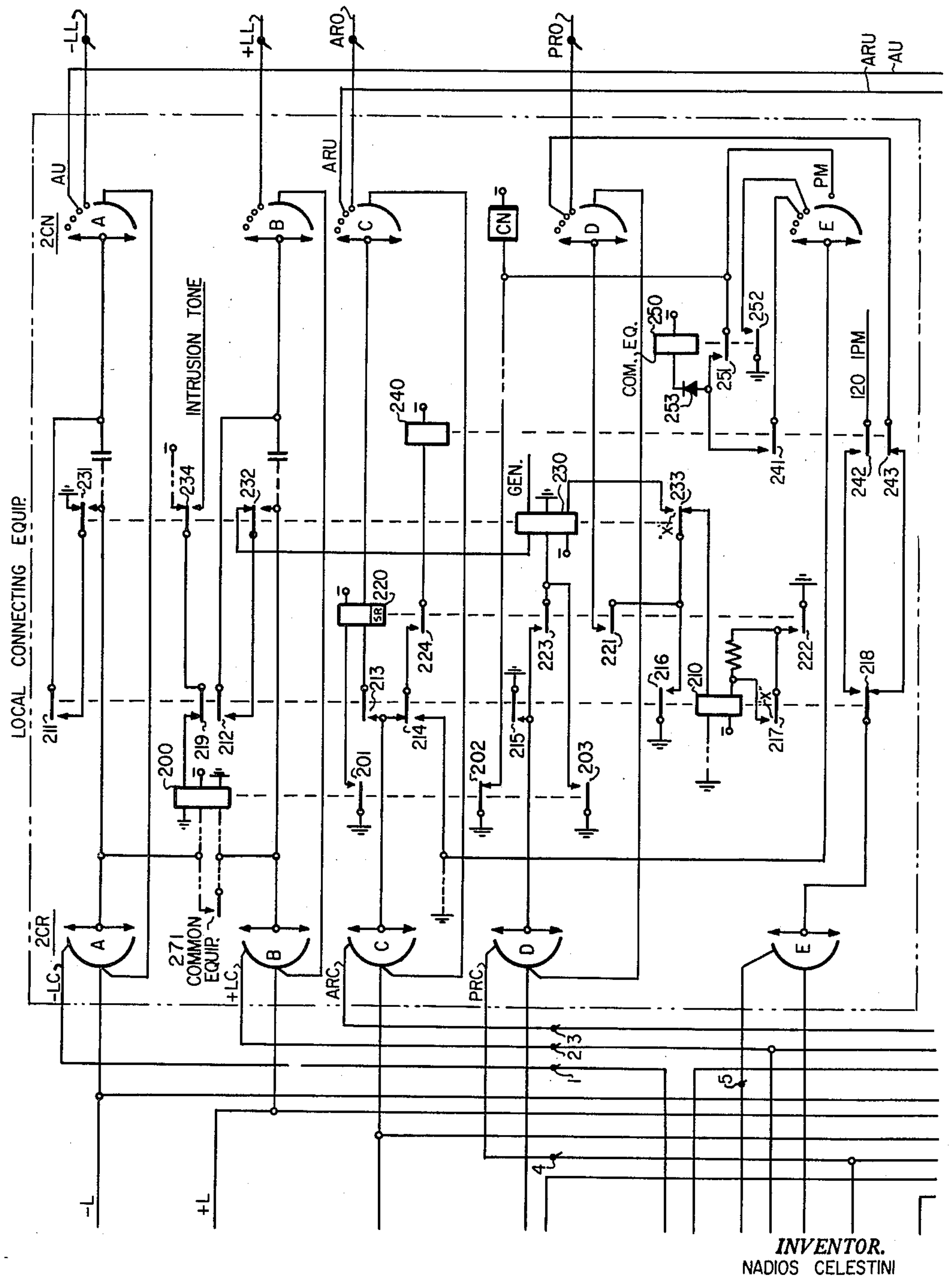

A PABX subscriber that is privileged to set up any type of connection extending over a central office trunk, including toll connections, is characterized by having marking conductor AR in his line circuit connected to battery, as shown at 158 in FIG. 1. This battery has the following functions:

(a) Battery potential at conductor AR or more precisely absence of ground potential at conductor AR, in conjunction with the provision of strap 1508, FIG. 1, has the effect of permitting the subscriber to obtain automatic access to a central office trunk circuit upon dialing the trunk access digit "3" into the local link, FIG. 2.

(b) The presence of battery on the multiple branch AR, FIG. 3, of this conductor results in the immediate operation of relay 370 in trunk circuit, FIG. 3, upon closure of the path through contacts 361 as hereinafter traced, as soon as the trunk finder 3CE has connected up with the calling subscriber's line circuit responsive to the dialing of the aforementioned trunk access digit "3." The immediate operation of relay 370 at its contact 372 opens the circuit of counter switch 3MD and thereby prevents this switch from setting up a bridging path, at contacts 381 of relay 380, for blocking the trunk call when the following digit "9" dialed by the subscriber identifies the call as a toll call.

(c) If the subscriber, in the course of his trunk call indicates a call-back connection by depressing non-locking button 142 at his substation then the above mentioned battery potential 158 is passed on, through the make side of contact 345 to lead ARC of the call-back line and thence to the C-bank contact corresponding to this line and the C-wiper of the line finder of the local link seized in the call-back connection thereby setting-up in the last-mentioned link conditions similar to those under A above. As a result the toll privilege of the calling subscriber is preserved for the purpose of any call that the subscriber may wish to set-up over the call-back line.

The subscriber with unrestricted trunk privilege noted above will remove the handset (not shown) from the telephone set 140, FIG. 1, and thereby automatically cause the insertion of dial 141 into the subscriber line 143 for closing a loop path to the associated subscriber line circuit 150, which may be of the common line relay type having a cut-off relay 1502 such as shown in FIG. 1. The subscriber line loop is thereby completed from battery through resistor 152, contacts 153 of relay 1502, over one side of the subscriber line 143 to dial contacts 141 and back over the other side of the line through contacts 155 and rectifier 156 to ground potentional of common equipment (not detailed). The common equipment thereafter operates automatically to control an idle unit of local connecting equipment, FIG. 2, by placing at 271 a shunt across wiper A and wiper B of the non-numerical switch 2CR, FIG. 2, collectively shown as a rotary switch set of wipers and associated bank levels upon whose bank contacts appear a multiple of the wiring to all subscriber's line circuits, as well as call-back line circuits, plus marking conductors or leads used in the establishment of connections with corresponding restrictions. It shall be understood that the magnet (not shown) of the non-numerical switch 2CR is operable, under the control of the common equipment, to function as a rotary switch finder which automatically searches for an activated line circuit, either a subscriber's line circuit or a call-back line circuit.

Returning now to the shunt placed across wipers A and B, FIG. 2, as mentioned above, a circuit is thereby completed for stopping control operation of the common equipment (not shown) at the respective −L, +L contacts of bank levels A and B, FIG. 2, to which the local finder 2CR has automatically rotated its wipers and established a circuit path including the shunt. This completed circuit path extends from battery, resistor 152, at subscriber line circuit 150, FIG. 1, contacts 153, over one side of subscriber's line 143, to dial contacts 141, then back over the other side of subscriber's line 143 and conductor +L to bank level B, FIG. 2, through its wiper to the shunt contacts 271, on to wiper of bank level A, FIG. 2, then conductor —L, through contacts 151 of subscriber line circuit 150, FIG. 1, and to ground in the common equipment. The common equipment is thereby conditioned for operating relay 200, FIG. 2, through its upper winding, contacts 219 of relay 210 and contacts 234 of relay 230. Relay 200 operates, closes a circuit through its contacts 201 and the upper winding of relay 220. Relay 220 operates, completes a circuit from contacts 203 of relay 200, contacts 223 of relay 220, through the wiper resting on bank level D of rotary switch 2CR, FIG. 2, marking lead PR to the winding of relay 1502 in the subscriber's line circuit 150, FIG. 1. Line cut-off relay 1502 operates. The previously mentioned circuit to common equipment 180 is thereby opened at contacts 151 and 155 of relay 1502. The operation of relay 1502 also completes a circuit from battery, resistor 152, contacts 153, through line lamp 163 to ground at the local operator's desk 160, FIG. 1. The lighting of this line lamp is a supervisory indication to the attendant that a telephone call is about to be established. Another circuit completed by the operation of relay 1502 extends from ground, through the lower winding of relay 200, FIG. 2, other apparatus not shown, wiper and bank level B of 2CR, conductor +L to dial contacts 141, back over the subscriber line 143, through contacts 151 of subscriber line circuit 150, over conductor —L, wiper and bank level A of 2CR, FIG. 2 and the center winding of relay 200 to battery.

The last-mentioned circuit forms a subscriber line loop and conditions the local connecting equipment, FIG. 2, for setting-up the desired connection.

As mentioned previously, the calling subscriber dials over the loop, extending to relay 200, the trunk access digit 3 and in a familiar manner each impulse of this digit allows the relay 200 to restore and repeat the impulses in a circuit path from ground, contacts 202 of relay 200, FIG. 2, through other apparatus, not shown, and the winding of magnet CN to battery. These impulses cause magnet CN of rotary connector switch 2CN to advance its wipers, as a unit, to the third contacts on each bank level and then come to rest in a familiar manner. The resting of the wiper on contact 3 of bank level D of rotary connector switch 2CN, FIG. 2, completes a circuit from ground, upper winding of relay 210, contacts 233, relay 230, contacts 221, the wiper resting on contact 3 of bank level D, contacts 243, contacts 218, then to the wiper resting on bank level E of rotary switch finder 2CR, FIG. 2, and conductor LOD to jumper connection 154, FIG. 1, contacts 153 of relay 1502, and resistor 152 to battery. This jumper 154 is provided only in the line circuits of those subscribers that are privileged for connections, in one way or another, to a trunk circuit such as that shown in FIG. 3. Relay 210 operates its "X" contact 217. A locking circuit for relay 210 is thus closed from ground, contacts 222 of relay 220, contact 217, lower winding of relay 210 to battery.

Another circuit completed by the operation of relay 210 is contacts 231, FIG. 2, contacts 211, conductor AU, wiper and bank level A of connector switch 2CN, winding of relay 320, FIG. 3, and contacts 391 to battery. Relay 320 in operating at contact 321 closes an obvious loop circuit for line relay 300 extending through differential relay 3101; at 323 closes an interrupter circuit for trunk finder magnet CE; and at the make side of contacts 322 prepares a test circuit for relays 310 and 330 in series. It should be noted here that relays such as 330, which are denoted "Com. Eg." in the drawings, are provided in common with the circuit (e.g. trunk circuit, FIG. 3) in connection with which they are shown—assuming that a plurality of such circuits are used.

Upon the operation of relay 300 a loop circuit is closed over the central office trunk +LE, —LE, from conductor +LE, other apparatus now shown, contact 344, contact 301 of relay 300, a lower winding of rept coil RC, other apparatus, then contacts 342 through yet other apparatus, and the upper winding of rept coil RC, contact 341, to conductor —LE. This circuit serves to seize the central office equipment and later serves to repeat to the central exchange the digital impulses for setting-up the desired connections as determined by the following digits of the directory number of the called subscriber.

Responsive to the closure of contact 323 the trunk finder rotates its wipers in search of the calling subscriber's line circuit in accordance with a marking received from the local finder 2CR. The interrupting arrangement for magnet CE, FIG. 3, relies on the alternate operation and release of relay 330, FIG. 3, interrupter springs (not shown) of magnet CE being inclined in the circuit extending through the lower winding of relay 330. The interrupting circuit for magnet CE, FIG. 3, extends from ground through contacts 331, contacts 311, contacts 323, other apparatus not shown, and then the winding of magnet CE to battery.

The trunk finder 3CE, FIG. 3, continues to operate automatically until a stopping circuit is completed which extends, generally speaking, from the trunk circuit, FIG. 3, through to the local link equipment, FIG. 2, and then back to common relay 330. This circuit may be traced from ground, upper winding of relay 310, FIG. 2, contact 322, contact 345, wiper and bank level C of finder 3CE, bank level and wiper C of local finder 2CR, FIG. 2, contact 213, lower winding of relay 220, wiper and bank level C of local connector 2CN, conductor ARU through other apparatus not shown, to the upper winding of relay 330, FIG. 3 and battery. It will be noted from the drawings that resistance battery through marking conductor AR of the line circuit, in effect, is connected in shunt with relay 330 in this circuit; however, this shunt circuit has an adverse effect on the finding operation of trunk finder 3CE for the reason that resistor 1509 has a relatively high resistance whereas the windings of relay 310 and 330 which are included in the above stopping circuit are of relatively low resistance. Relay 310, FIG. 3, operates, closes a locking circuit for itself through magnet winding CE, other apparatus not shown, contact 323, contact 311, then to the lower and upper windings of relay 310 in series. The circuit to magnet CE is opened at contacts 311, so that all wipers of rotary switch finder 3CE are arrested in the position corresponding to the calling subscriber's line circuit. Since the above-mentioned stopping circuit extends through the lower winding of relay 220, FIG. 2, an opposing magnetic field is set up which causes a slow release of relay 220. After a period of time, this causes the opening at contact 222 of the holding circuit of relay 210 and thereby causes the release of this relay. The restoration of relay 220 and relay 210, at contacts 223 and 215 respectively, removes ground potential extending from the local connecting equipment, FIG. 2, by way of the PR marking lead to cut-off relay 1502 of the line circuit.

Yet another circuit set-up by the operation of relay 310, FIG. 3, extends from booster battery through contact 312, winding of relay 390, other apparatus not shown, the winding of relay 360, contacts 347, wiper and bank level D, FIG. 3, to another marking lead PRD extending to jumper connection 1508, FIG. 1, in subscriber's line circuit 150, then over marking lead PR, through rotary switch finder 2CR wiper and bank level D, FIG. 2, to contacts 215 and ground before relay 220 has become released as noted above.

In response to booster battery, relay 390, FIG. 3, operates, closes its temporary locking circuit through booster battery, contact 312, winding of relay 390, through its contact 392 and other apparatus not shown, to ground. The latter ground now extends through other apparatus mentioned and contacts 392, then the winding of relay 360 in series with contact 347, relay 340, through wiper and bank level D, FIG. 3, to marking lead PRD, the above-mentioned jumper connection 1508, FIG. 1, and then winding of relay 1502 to battery. Relay 360, FIG.

3, operates, closes a locking circuit for itself through another winding (not shown) of the relay.

Prior to the removal from the PR lead of ground potential extending from the local connecting equipment, FIG. 2, as noted above, it is essential that an equivalent ground potential be impressed upon lead PRD in multiple with PR, in order to guard against the release of the line cutoff relay 1502, FIG. 1, in the subscriber's line circuit. Such a guarding circuit now exists from ground, contact 362 of relay 360, FIG. 3, contact 347, wiper and bank level D, lead PRD, jumper connection 1508, FIG. 1, winding of relay 1502 to battery.

It has been mentioned previously that relay 390, FIG. 3, was operated and temporarily held through a locking circuit. The described operating circuit through the winding of relay 320 is opened at contact 391 of relay 390, and relay 320 releases. It opens the above temporary loop circuit closed by contact 321, but relay 300, FIG. 3, remains operated since there is now an alternative loop circuit extending from battery, upper winding of relay 300, upper winding of relay 3101, wiper and bank level A of the trunk finder 3CE over —L conductor to subscriber's line circuit 150, FIG. 1, contact 151, one side of subscriber's line 143, dial contacts 141 at subscriber's telephone 140, back over the other side of the subscriber's line and +L conductor, wiper and bank level B of finder 3CE, FIG. 3, lower wniding of relay 3101 and lower winding of relay 300 in series to ground. Another circuit established by the release of relay 320, FIG. 3, may be traced from battery potential 158 in subscriber's line circuit 150, FIG. 1, connected by jumper 157, resistance 1509, marking conductor AR wiper and bank level C of trunk finder 3CE, FIG. 3, contacts 345, and 361, through the winding of relay 370 and other equipment, not shown, to ground. It will be remembered that battery potential through jumper 157 serves to privilege the PABX subscriber to any type of trunk connections including toll connections. Relay 370, therefore, operates immediately after seizure of the subscriber's line circuit by trunk finder 3CE, and at contact 372 opens an otherwise possible impulsing circuit to the magnet MD of the counter switch 3MD, FIG. 3, which in the case of calls from less privileged subscribers serves to keep these subscribers from establishing toll connections. The next phase of operations is that subscriber 140, FIG. 1, dials the second digit which is a 9 for toll connections over the subscriber's loop extending to relay 300, FIG. 3. The nine digital impulses imparted on relay 300 are repeated at contact 301 to the previously described loop circuit extending to the central exchange over trunk conductors —LE and +LE.

It is evident that the privileged subscriber may now proceed to set-up toll connections without blocking restrictions which would otherwise occur if the subscriber line circuit were not equipped with a jumper connection to battery potential.

SETTING-UP OF CALL-BACK CONNECTION

During the course of his conversation with the called subscriber, by way of the established trunk connection, the local PABX subscriber may temporarily interrupt the conversation, and proceed to set-up a call-back connection, for example, in order to obtain supplementary information from another subscriber. The latter may be one served by the local PABX equipment, or otherwise another subscriber in the central office. In either instance, a call-back connection will be set-up in the PABX equipment, and in the present description it will be assumed that a call-back connection through a second trunk circuit to another central office exchange subscriber is desired.

The calling subscriber requests the called central office subscriber to remain on the line and await further information. As previously mentioned, the calling subscriber initiates a call-back connection by momentarily depressing a button on his telephone set. As will be described in detail hereafter, this results in the extension of the subscriber's line loop, through the trunk circuit and call-back line, to the local connecting equipment, and thus enables him to dial up a connection to the desired subscriber. The central office trunk is automatically held for the duration of the call-back connection. After obtaining the supplementary information desired, the calling subscriber again momentarily depresses the button on his telephone and thereby automatically regains access to the trunk circuit used in the established trunk connection so that he may resume his conversation with the called subscriber in the central exchange area. Thereafter, the equipment used in the establishment of the call-back connection restores to normal.

As previously mentioned, to initiate a call-back, the calling subscriber momentarily depresses the button 142 of his telephone 140, FIG. 1, and thereby impresses a ground on one side of subscriber line 143, extending through subscriber line circuit 150 to +L conductor, wiper and bank level B of trunk finder 3CE, FIG. 3, to lower winding of differential relay 3101, and lower winding of relay 300 to ground. This shunting circuit for the lower winding of relay 3101 causes the operation of differential relay 3101. A circuit is closed by its contact 3102, other apparatus not shown, then through the winding of relay 340 which serves as the switching device for switching the PABX subscriber to the call-back line. Relay 340 operates its locking circuit, after restoration of the button on the telephone, which is from ground, contact 3103, through other apparatus not shown, contact 348 and winding of relay 340 to battery. A loop is closed across trunk conductors —LE and +LE, by contact 349 of relay 340, FIG. 3 thereby to hold the central exchange equipment.

Upon the operation of relay 340, other apparatus, not shown, functions to place a shunt at 397 in multiple with repeating coil RC, FIG. 3, for creating a closed loop condition, equivalent to that previously described in connection with the calling subscriber's line, across the line conductors +LC, —LC of the call-back line. This conditions the common equipment to cause the finder, for example, 2CR of an idle unit of local connecting equipment to search for and seize the call-back line circuit 170, FIG. 1, associated with the trunk circuit in question.

The loop closed by the last-mentioned shunt extends from battery through resistor 174, contact 173 of call-back line circuit 170, FIG. 1, over —LC1 conductor to contact 341, FIG. 3, and shunt 397, contact 301, contact 344, over the +LC conductor to contact 175, FIG. 1, through rectifier 176 of call-back line circuit 170 to ground in common equipment 180. The starting of an idle line finder 2CR, takes place under the control of the common equipment in a manner similar to that described above in connection with the initial call from a subscriber line. Likewise, the common equipment, at contacts 271, places a shunt across wipers A and B of finder 2CR, FIG. 2, to cause the finder to stop at the bank contacts —LC and +LC, of the call-back line. A circuit is thereby closed, extending from battery, resistor 174 of call-back line circuit 170, FIG. 1, contact 173, over conductor —LC1, to contacts 341, 397, 301 and 344, over the +LC conductor to bank level B of finder 2CR, FIG. 2, through shunt 271 therein and bank level A, over conductor —LC to contact 172 of call-back line circuit 170, FIG. 1, and ground in the common equipment. As previously described, relay 200 now operates through its upper winding, contacts 219 and 234, and other apparatus, not shown, to battery. Operation of relay 200, FIG. 2, is followed by the operation of relay 220, so that ground is extended through contacts 203 and 223, over wiper and bank level D of finder 2CR, to marking conductor PRC, winding of call-back line cut-off relay 171, FIG. 1, and battery. Relay 171 operates and completes a circuit from battery, resistance 174, contact 173, call-back line lamp 162 to ground at the local operator desk 160, FIG. 1. The lighting of this lamp is an indication to the local operator that a call-back connection is about to be established by the PABX subscriber.

The common equipment is now conditioned to remove shunt 271 across bank levels A and B of finder 2CR, FIG. 2, as above described, so that a circuit extending over the call-back line is completed for the lower and center windings of line and impulsing relay 200, FIG. 2.

Also under the control of the common equipment, shunt 397 across repeating coil RC, FIG. 3, is removed, thereby permitting relay 200, FIG. 2, to be included in the two legs of a repeated impulsing circuit extending over the call-back line. One leg of the circuit is completed from battery at contact 343, FIG. 3, through other apparatus, not shown, lower winding of repeating coil RC, contacts 301 and 344, conductor +LC to bank level B of finder 2CR, FIG. 2, then through the wiper and other apparatus, not shown, and lower winding of relay 200 to ground. The other leg of the circuit extends from ground at contact 302 of relay 300, FIG. 3, contact 342, through other apparatus, not shown, an upper winding of repeating coil RC, FIG. 3 to contact 341 over the —LC1 conductor, and contact 172 of the call-back line circuit 170, FIG. 1, then conductor —LC to bank level A of finder 2CR, FIG. 2, and thence through the wiper and other apparatus to the center winding of relay 200, FIG. 2, to battery.

As mentioned previously battery potential 158 in subscriber's line circuit 150, FIG. 1, which characterizes the PABX subscriber as one entitled to trunk connections of all kinds, including toll connections, caused the operation of relay 370, FIG. 3, at the time the trunk finder linked up with the calling subscriber. Upon the operation of relay 340 this battery potential is transferred at contact 345 to marking conductor ARC of the call-back line. This circuit may be traced from battery potential 158, FIG. 1, jumper 157, marking conductor AR extending through wiper and bank level C of trunk finder 3CE, FIG. 3, to contact 345, over call-back marking conductor ARC to the corresponding terminal on bank level C of local finder 2CR, FIG. 2. The battery potential applied at the subscriber's line circuit and thus passed to the call-back line thereby becomes available, at the local connecting equipment, for permitting unrestricted toll service over other trunk circuits and trunk lines to the central exchange in a manner previously described if the trunk access digit 3 is dialed in the call-back connection.

More particularly, it wil be clear from the foregoing description that the dialing of trunk access digit 3 at this point will result in the seizure of another trunk circuit similar to that shown in FIG. 3, and the finder, similar to 3CE of this other trunk circuit will then be started in search of the call-back line multiple indicated by numerals 1, 2, 3, 4, 5 in FIGS. 2 and 3. It will be noted that in this case the line cut-off relay in question, namely 171 of call-back line circuit 170 is connected to the corresponding test conductor, PRC (bank multiple 4) directly rather than through a strap such as 1508. This is for the reason that the indication of a call over a call-back line signifies in itself that the calling PABX subscriber is entitled to trunk access; if he had no trunk access he would not have been able to be connected to a call-back line in the first place. Furthermore, it will be clear that after the second trunk finder similar to 3CE, has been stopped on the call-back lines 1, 2, 3, 4, 5 associated with the first trunk circuit, the local link, similar to that shown in FIG. 2, which was used in setting up the connection to this trunk circuit is automatically released; and that at this time the following toll-privilege marking circuit is closed for relay 370 of the second trunk circuit: battery potential 158 in the calling subscriber's line circuit, jumper 157, resistance 1509, conductor AR, C-bank and wiper of finder 3CE of the first trunk circuit, make side of contact 345, marking conductor ARC of the call-back line associated with this trunk circuit, bank multiple 3, C-bank and wiper of the finder of the second trunk circuit, back side of contact 345, contacts 322, 361, winding of relay 370 of the second trunk circuit, ground. Relay 370 at its contact 372 disables the counter switch of the second trunk circuit and thereby provides the calling PABX subscriber to set up in this call-back any connection over the second trunk circuit, including toll connections.

CUTTING-IN ON BUSY LINE (EXECUTIVE RIGHT-OF-WAY PRIVILEGE)

Let it be assumed now that the calling subscriber instead of setting up another trunk connection across the call-back line as just described, wishes to establish a connection to another PABX subscriber.

Let it further be assumed that the called PABX subscriber's telephone number is 8. The calling subcriber dials the digit 8, these dial impulses being repeated by line relay 300 of the trunk circuit, FIG. 3, by way of the call-back line to the lower and center windings of relay 200, of the local link seized in the call-back connection. Relay 200 follows these impulses, and at contact 202 drives the magnet CN, of connector 2CN, accordingly until the wipers reach the respective bank level contact 8. Assuming the called subscriber's line is busy, the local connecting equipment, FIG. 2, used in this connection would have its relay 210 operated. Therefore a ground potential, by way of contact 215, appears on bank level D, contact 8, on both the finder and connector sides of each link. Relay 210 of the local connecting equipment used in the call-back connection does not operate under this condition, since ground potential is on either side of its upper winding. Thus, busy tone is returned to the calling subscriber by the common equipment, not shown, in a familiar manner.

It will now be assumed that the calling subscriber engaged in the establishment of the call-back connection has the privilege of executive right-of-way service. His subscriber line circuit is then equipped with a strap providing battery through resistor 1504, FIG. 1, in multiple with line cut-off relay 1502.

It may be mentioned at this point that if the local line finder 2CR, FIG. 2, were connected directly to the subscriber's line circuit, FIG. 1, as it would be in the case of a direct local call (not involving the call-back line) from substation 140 to a busy called PABX subscriber, then marginal relay 230 would be permitted to operate, due to the shunt connection of resistance battery 1504 to the PR lead namely over the following circuit: battery through the winding of cut-off relay 1502, and in shunt thereto, battery through resistor 1504, lead PR, D-bank contact and wiper of finder 2CR, contacts 223, center winding of relay 230, to ground. This circuit would be completed as soon as the calling subscriber dialed any digit, for example, into the local link to avail himself of his executive right-of-way privileges, by causing the momentary release of relay 200. Relay 230 would then cause the connector to cut in on the busy line in a manner described in more detail hereinbelow.

Returning now to the call-back connection, and more particularly to the point at which the call-back was initiated by the operation of the differential relay 3101, a similar privilege-marking circuit may in this case be traced from battery through the winding of line cut-off relay 1502 and in shunt thereto, battery through resistor 1504 in subscriber's line circuit 150, FIG. 1, through jumper 1508, over marking lead PRD to wiper and bank level D of trunk finder 3CE, FIG. 3, winding of relay 350 and contact 362 to ground. In this connection it should be remembered that contact 347 is open due to the operation of relay 340, FIG. 3, under the control of relay 3101, and that relay 360 has remained operated. Relay 350 is marginal and conditioned to operate in the above traced circuit only when the above-mentioned resistor 1504, FIG. 1, is connected in multiple with line cut-off relay 1502. Line cut-off relay 171 of call-back line circuit 170, FIG. 1, is similar to subscriber's line cut-off relay 1502, except that it does not have an individual resistor connectable in multiple therewith. However, an equivalent resistance battery is now placed in multiple with line cut-off relay 171 under the control of relay 350 to extend executive right-of-way privilege of the calling subscriber line by way of the call-back line to the local link. The corresponding circuit may be traced from battery through resistor 352, contact 351, over call-back executive right-of-way marking lead PRC in multiple with battery through line cut-off relay 171, the appearance of PRC at bank level D of finder 2CR, FIG. 2, then through the wiper A of this finder, contact 223 to ground at contact 203 directly, or, after the release of relay 200, through the center winding of relay 230 to ground. Relay 230 does not operate at this time, as the ground through contact 203 short-circuits its center winding.

The calling subscriber now asserts his executive right-of-way privilege by dialing a single digit 1. This causes line relay 200, FIG. 2, which is operated by way of the call-back line as previously described, to temporarily restore and open its contacts 203. The above short-circuit of the center winding of relay 230 is thereby removed, and relay 230, FIG. 2, permitted to operate over the described circuit including lead PRC and line cut-off relay 171, FIG. 1, and resistor 352, FIG. 3, in multiple. A temporary locking circuit for relay 230 may be traced from battery, lower winding of relay 230, contact 233, contact 221 of relay 220, FIG. 2, wiper and bank level D to the busy marking ground thereon. Intrusion tone is impressed upon the upper winding of relay 200, FIG. 2, through contacts 234 and 219, causing a like tone to be induced into the center and lower windings of relay 200 to inform the busy called subscriber that an executive right-of-way connection is awaiting. He then causes the release of his own telephone connection by the restoration of his telephone handset. This results in the removal of locking ground from bank level D of connector 2CN, FIG. 2, so that relay 230 restores. Its contact 234 opens the above intrusion tone circuit. The called subscriber has restored his handset. The restoration of relay 230, FIG. 2, closes a circuit extending from battery, winding 1502 of called subscriber's line circuit 150, FIG. 1, over marking lead PR to D bank and wiper of connector 2CN, FIG. 2, then contact 221, break side of contact 233, upper winding of relay 210, and other apparatus not shown, to ground. Relay 210 operates and locks as previously described.

Ringing current is now impressed upon the called subscriber's line loop over a circuit traced from generator, FIG. 2, through the upper winding of relay 230, contact 232, contact 212, wiper and bank B of connector 2CN, +L conductor, one side of subscriber's line to the called station telephone, FIG. 1, through its ringer, not shown, back over the other side of the line to contact 151 of line cut-off relay 1502 in the called subscriber's line circuit, FIG. 1, —L conductor, wiper and bank contact and wiper A of connector 2CN, FIG. 2, contacts 211, and 231 to ground. The called subscriber removes his handset, and thereby completes a direct current path through the circuit described. Relay 230 operates, locks over a circuit from battery, lower winding, "X"-contact 233 and contact 221, to ground at contact 216.

The operation of relay 230 and relay 210, FIG. 2, switches the transmission path from the calling subscriber to the called subscriber through, this path extending by way of the trunk circuit, the call-back line and the local connecting equipment used in establishing the call-back connection.

B. *Call from subscriber privileged for trunk connections not including toll connections*

The procedure for setting-up a trunk circuit connection in this category is similar to that described above under section A except that the jumper 157 of the subscriber's line circuit 150, FIG. 1, does not exist in this case so that there is normally no potential connected to conductor AR. Therefore the battery potential 158, FIG. 1, could not be extended over this marking conductor AR to the trunk circuit, FIG. 3, for the immediate operation of relay 370 therein, after the trunk finder has seized the calling line. Assuming that the calling subscriber, after having gained access to the trunk circuit as described above, dials a 3 as the second digit which signifies an ordinary (non-toll) trunk connection, the impulsing relay 300 of the trunk circuit, FIG. 3, is permitted to repeat these digital impulses to counter switch 3MD, FIG. 3. This impulsing circuit extends from ground, through contact 303 of relay 300, through other apparatus not shown, contacts 382, and the break side of contact 372 to winding MD of counter switch 3MD, and battery. The latter switch advances its wiper A to bank contact 3. A circuit is thereby closed from battery, contact 346 of relay 340, through wiper A to bank contact 3, then resistor 395, winding of relay 370, FIG. 3, and other apparatus not shown, to ground. Relay 370 operates at this time.

A locking circuit for relay 370 may be traced from ground, other apparatus not shown, winding of relay 370, resistor 395, wiper and bank contact 3 of counter 3MD, contact 371, resistor 396, to battery. The operation of relay 370, at its contact 372, also opens the impulsing circuit to counter switch 3MD and thereby prevents further operation from additional digits dialed by the calling subscriber. Counter 3MD remains operated for the duration of the trunk call.

It is therefore evident that the calling subscriber has caused the operation of relay 370 by dialing the non-toll digit 3, whereas its operation, in the case of the privileged subscriber in section A, was caused immediately by the battery potential impressed upon marking conductor AR extending from his line circuit as previously described.

Let us assume now that the calling subscriber dials the digit 9, which, as described in section A, is the second digit for establishing toll connections via the central office. Therefore in this case the impulsing circuit to counter switch 3MD causes rotation of its wiper to bank contact 9 in the general manner described above. A circuit may be traced from battery, contact 346, wiper and bank A of counter switch 3MD, winding of relay 380 to ground. Relay 380 operates, closes a locking circuit through its winding, contact 383, resistor 396 to battery. Contact 381 closes a shunt across trunk line conductors —LE and +LE, thereby blocking the dialing of additional digits into the central office over these conductors. The operation of relay 380, at its contact 382, also opens the impulsing circuit to counter switch 3MD and thereby prevents further operation of this switch from additional digits dialed by the calling subscriber.

It will be understood that what has been said under section B in connection with trunk calls established in the regular manner by dialing the trunk access digit 3, also holds true for the situation in which a PABX subscriber of this category, after having gained access to a trunk circuit, initiates a call-back by depressing his push button and then dials the trunk access digit 3 thereby causing the local link seized in the call-back connection to take a second trunk circuit into use. In this case, since no battery potential through resistance 1509 has been passed to the second trunk circuit by way of lead ARC of the call-back line, relay 370 of this second trunk circuit will not be able to operate immediately upon seizure of the call-back line by the finder of this second trunk circuit. Instead, the relay will operate only when a 3 has been dialed over the second trunk, as just explained, thus enabling the subscriber merely to set up non-toll connections over the second trunk.

*C. Call from subscriber privileged for trunk connections only with attendant's assistance*

This class of subscriber while not privileged for automatically setting-up connections through the trunk circuit to called subscribers in the central exchange may still get trunk access with the assistance of an attendant, in the local PABX, who supervises establishment of such a connection. Such subscribers are characterized by the provision in the associated line circuit 150, FIG. 1, of jumper 157 which connects ground potential 159 to the marking conductor AR as portion of a circuit later described.

In a manner similar to that described under section A of this description, the calling subscriber dials the digit 3 and advances the wipers of connector 2CN, FIG. 2, to bank level contact 3 as previously mentioned. The operation of the local connecting equipment is similar, except that in this instance relay 240, FIG. 2, has operated responsive to the operation of relay 220, namely in a circuit traced from ground potential 159 through jumper 157 of subscriber line circuit 150, FIG. 1, marking conductor AR, bank contact and wiper C of finder 2CR, FIG. 2, contact 214, contact 224, and winding of relay 240 to battery. Thus, upon dialing of trunk access digit 3, a circuit is completed from ground, other apparatus not shown in FIG. 2, extending to the wiper resting upon contact 3 of bank level E of connector 2CN, then contact 241, rectifier 253, and winding of common equipment relay 250 to battery. Relay 250, in operating at its contact 251 closes an obvious circuit to motor magnet winding CN of connector 2CN, FIG. 2. The motor magnet thus advances the switch wipers until they come to rest on bank contacts 4. A circuit is thereby established from battery on conductor PRO, which connects to the attendant's common equipment not shown, through connector 2CN wiper and bank level D, FIG. 2, then contacts 221 and 233, upper winding of relay 210, and other apparatus, to ground. Relay 210 operates. Also a locking circuit for relay 240, FIG. 2, may now be traced from ground, contact 252 of relay 250, bank contact and wiper E of the connector, contact 214, contact 224, and winding of relay 240 to battery. With the above arrangement, connector 2CN, FIG. 2, has extended its levels A, B, C and D through to conductors −LL, +LL, ARD and PRO, respectively, of the attendant's common equipment. A signal is then forwarded to the attendant over a circuit traced from 120 IPM ground, contact 242 of relay 240, FIG. 2, contact 218, through wiper and bank level E of finder 2CR to conductor LOD, through jumper 154 of subscriber's line circuit, FIG. 1, subscriber line lamp 163 at local operator's desk 160, FIG. 1, to ground. Lamp 163 is intermittently shorted over this circuit. The line lamp flashing at 120 IPM is an indication to the attendant that the subscriber desires assistance in setting-up a connection through the trunk circuit, FIG. 3. While the drawings do not show this in detail, it will be understood that the attendant in a manner well known in the art now proceeds to seize a free trunk circuit, FIG. 3, and that the trunk finder 3CE then searches for and connects up with the subscriber's line circuit 150, FIG. 1, so that a connection is established to the central exchange. It will be understood that the local connecting equipment, FIG. 2, used in setting-up a connection to the attendant, as described above, will automatically release from service, substantially as above, described, thus causing the above 120 IPM flashing circuit through the subscriber's line lamp 163, FIG. 1, to be opened. The lamp will then stay lit steadily for the duration of the connection.

It will be understood that what has been said under section C in connection with trunk calls established in the regular manner, also holds true for the situation in which a PABX subscriber of this category, after having gained access to a trunk circuit, indicates a call-back by depressing his push-button and then dials the trunk access digit 3 into the local link seized in the call-back connection. In the present case, due to the fact that ground through resistance 1509 has been forwarded over lead ARC of the call back line, the connection of the last-mentioned link will be caused automatically from position 3 to position 4 so that he can gain access to a second trunk circuit only with the assistance of the attendant.

ATTENDANT TEMPORARILY BARS SUBSCRIBER FROM AUTOMATICALLY SETTING-UP TRUNK

A subscriber privileged for automatically setting-up connections through a trunk circuit to called subscribers in the central exchange area, such as described in section B, may be restricted to the category of section C, requiring the assistance of the attendant for the setting-up of such calls. The distinguishing arrangement, for such a subscriber is that his line circuit 150, FIG. 1, has a jumper 157 to terminal 1501 which is connected to a key 161 at the local operator's desk 160, FIG. 1. With such an arrangement, no potential normally appears on conductor AR whereby the subscriber is normally enabled to set-up trunk connections as described in section B of this specification.

However, if the attendant operates key 161, FIG. 1, this places ground potential on the AR marking conductor mentioned, and thereby temporarily provides a restriction which keeps the subscriber from setting-up connections to the central exchange only when assisted by the attendant as described in section C. There again, the same ground potential is automatically passed on to lead ARC of the call-back line, if the subscriber initiates a call-back during this trunk connection. Therefore the connector used in the call-back connection will in response of the dialing of a 3, automatically be advanced to position 4 so that this call is brought to the attention of the attendant.

Upon the termination of telephone calls established by connections set-up in accordance with the above description, it will be understood that all equipment restores or becomes inactivated and free for other services.

From the above-described restricted service arrangements for a PABX, it will be evident that a calling subscriber can not circumvent the restrictions, if any, assigned to his telephone by the establishment of a call-back connection.

Having described my invention and what is considered new and is desired to have protected by Letters Patent will be pointed out in the following claims.

What is claimed is:

1. In a telephone system, a restricted service arrangement comprising: a central exchange, a private automatic branch exchange, at least one trunk extending between said central exchange and said branch exchange and terminating in said branch exchange in a trunk circuit, a plurality of subscriber lines connected to said branch exchange, each terminating in a line circuit therein, wiring means in said line circuit for setting-up an electrical potential condition characteristic of the type of special service to which the associated subscriber is privileged, local connecting equipment in said branch exchange accessible to each said line circuit and including means jointly responsive to said potential condition and to a signal received over the subscriber line for setting-up special service connections including connections to said trunk circuit, said trunk circuit including means responsive to a signal thereafter received over said subscriber line for automatically seizing a call-back line also terminating in a line circuit having access to said connecting equipment, and means in said trunk circuit for passing an electrical potential condition corresponding to the first-mentioned condition corresponding to the first-mentioned condition onto the connecting equipment seized by said call-back line, whereby said subscriber is prevented from setting-up unauthorized special service connections by way of the last-mentioned equipment.

2. The combination in a telephone system as claimed in claim 1, wherein there is provided means operated after a connection between said line circuit and said trunk circuit has been established for releasing the local connecting equipment used.

3. The combination in a telephone system as claimed in claim 2, wherein said subscriber line circuit and said call-back line circuit each comprises a marking conductor, said wiring means in said subscriber line circuit being connected to the first-mentioned marking conductor; wherein there are provided first non-numerical switching means for giving said line circuits access to said connecting equipment and second non-numerical switching means for giving said line circuits access to said trunk circuit, said marking conductors being extended to said connecting equipment and said trunk circuit by said first and second non-numerical switching means respectively; and wherein the passing means in said trunk circuit include a switching device for switching the marking conductor of said subscriber line circuit, as extended by said second non-numerical switching means, through to the marking conductor of said call-back line circuit, thereby to set up on the last-mentioned conductor the electrical marking imparted to said first-mentioned conductor by said wiring means.

4. The combination in a telephone system as claimed in claim 3, wherein said wiring means in said subscriber line circuit includes means for marking said first-mentioned conductor in accordance with the type of trunk connections to which the associated subscriber is entitled, said jointly responsive means being controlled by said marking for permitting or not permitting the establishment of said type of trunk connection.

5. The combination in a telephone system as claimed in claim 4 wherein said marking means includes means for setting up a marking potential preventing the fully automatic setting-up of trunk connections by said subscriber.

6. The combination in a telephone system as claimed in claim 4 wherein said marking means includes means for setting-up a marking potential enabling the setting-up of toll connections by said subscriber by way of said trunk circuit.

7. The combination in a telephone system as claimed in claim 2, wherein said subscriber line circuit and said call-back line circuit each comprise an executive right-of-way marking lead, said wiring means in said subscriber line circuit including means for marking said first-mentioned marking lead; wherein there are provided first non-numerical switching means for giving said line circuits access to said connecting equipment and second non-numerical switching means for giving said line circuits access to said trunk circuit, said marking lead being extended to said switching equipment and said trunk circuit by said first and second non-numerical switching means respectively; wherein said local switching equipment comprises means for cutting in on a busy called subscriber line; and wherein the passing means in said trunk circuit includes a switching element connected to the marking lead of said subscriber line circuit, as extended by said second non-numerical switching means, for repeating the marking on said first-mentioned marking lead to said second-mentioned marking lead.

8. The combination in a telephone system as claimed in claim 7, wherein each said line circuit includes a cut-off relay connected to said marking lead; wherein said subscriber line circuit includes a resistance connectable in shunt with said cut-off relay by said marking means; wherein said cut-in means in said switching equipment includes a marginal relay operated only with said resistance connected in shunt with said cut-off relay; wherein said trunk circuit comprises a second resistance, said switching element being operated in the case of a call originated by an executive right-of-way privileged subscriber for connecting said second resistance to said second-mentioned marking lead.

References Cited by the Examiner

UNITED STATES PATENTS

| | | | |
|---|---|---|---|
| 2,574,943 | 11/51 | Voss | 179—18 |
| 2,943,155 | 6/60 | Rockwell | 179—27 |

ROBERT H. ROSE, *Primary Examiner.*

WALTER L. LYNDE, *Examiner.*